Feb. 3, 1942. E. L. DRIVER 2,272,160
TILE CUTTING AND BREAKING APPARATUS
Filed May 13, 1940 2 Sheets-Sheet 1

INVENTOR
Eber L. Driver
BY
Arthur L. Brown
ATTORNEY

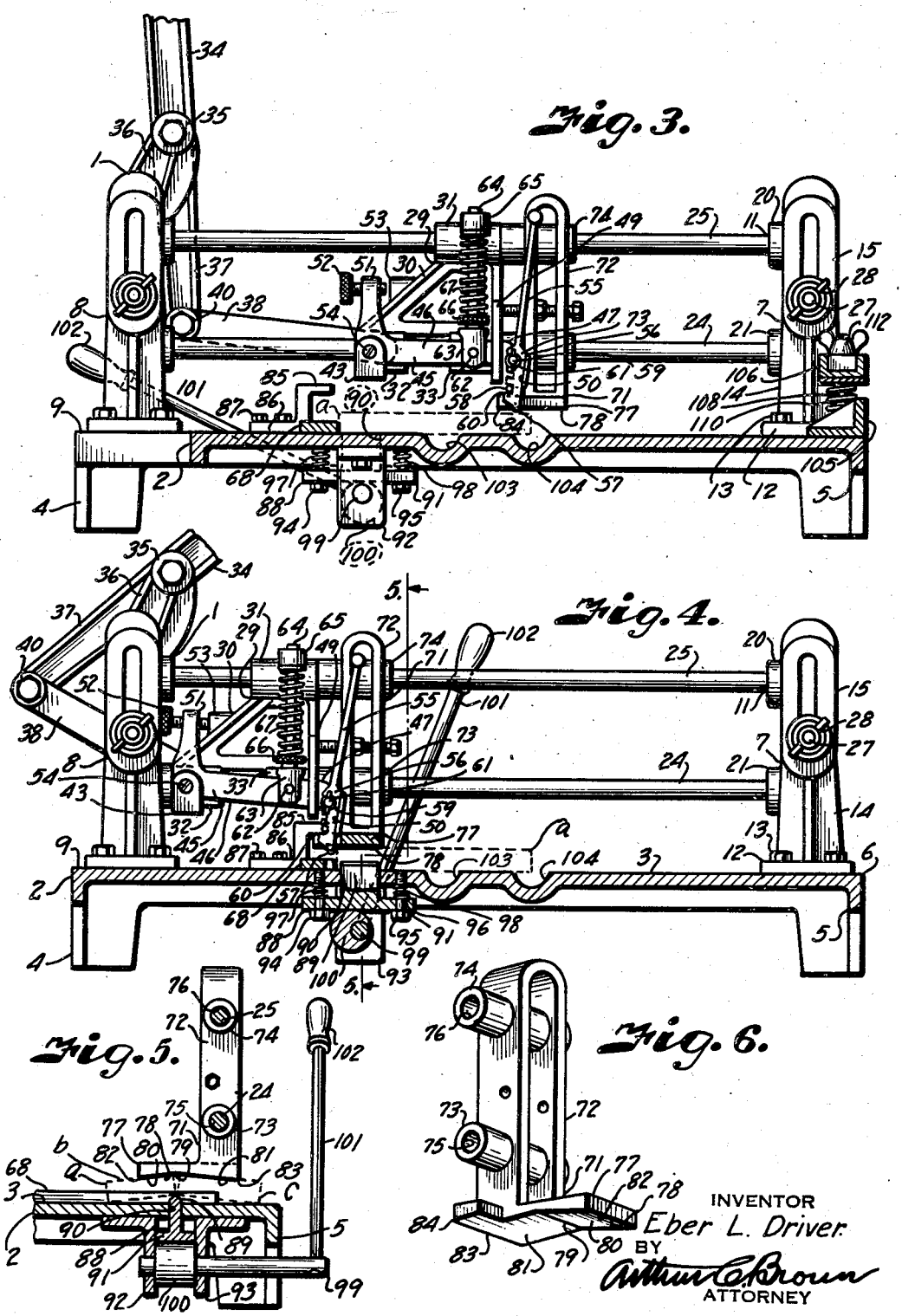

Patented Feb. 3, 1942

2,272,160

UNITED STATES PATENT OFFICE 2,272,160

TILE CUTTING AND BREAKING APPARATUS

Eber L. Driver, Kansas City, Mo.

Application May 13, 1940, Serial No. 334,919

5 Claims. (Cl. 125—23)

This invention relates to an apparatus for cutting and breaking work pieces such as tile, glass, and like objects of brittle character, and has for its principal object to facilitate cutting and breaking of such work pieces with greater accuracy and without injury to the operator.

Other objects of the invention are to provide for breaking a tile or the like directly in the position in which it is cut so as to reduce handling thereof; to provide for cutting and breaking tile having irregular surfaces; and to provide for breaking "bull nose tile" and other irregular shape tile with a single placement thereof.

In accomplishing these and other objects of the invention, I have provided improved details of structure, the preferred form of which is illustrated in the accompanying drawings, wherein:

Fig. 3 is a vertical cross-section on the line 3—3 of Fig. 1, showing the cutter in position for making a cut across the surface of a tile.

Fig. 4 is a similar view showing the cutter as it is passed across the tile and the breaking mechanism moved into position to break the tile on the line of cut.

Fig. 5 is a cross-section on the line 5—5 of Fig. 4.

Fig. 6 is an enlarged detail perspective view of the upper pressing or breaking member.

Figure 1:
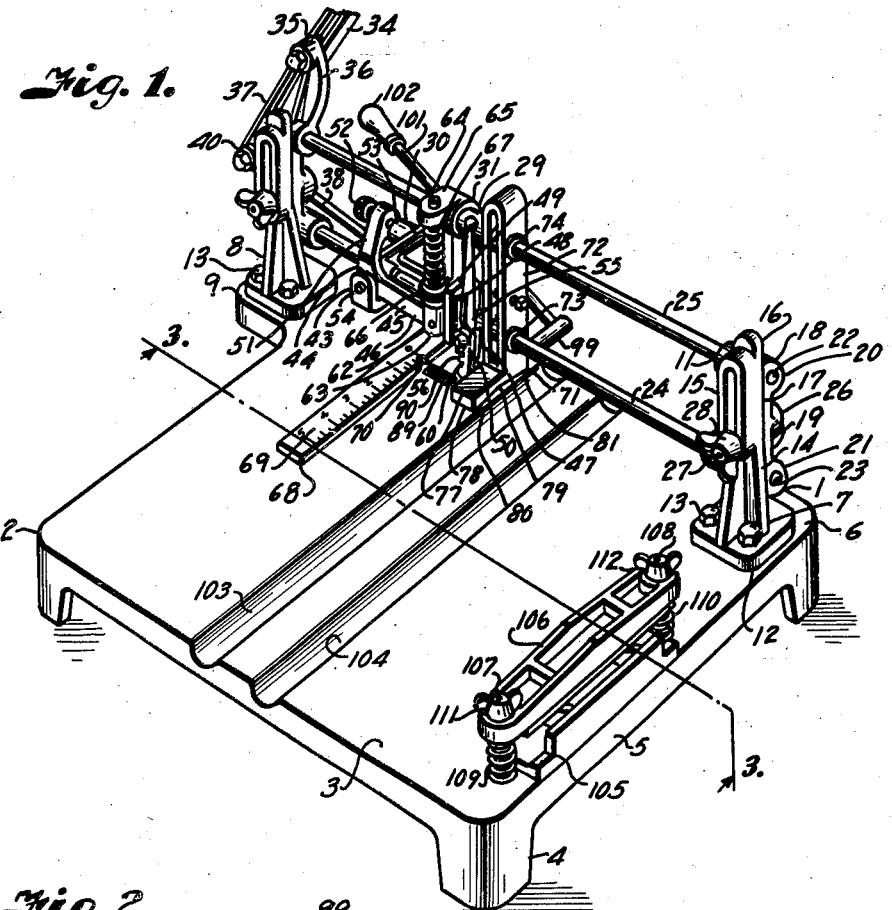
Fig. 1 is a perspective view of a tile cutting and breaking apparatus constructed in accordance with the present invention.

Referring more in detail to the drawings:

1 designates a cutting and breaking apparatus constructed in accordance with the present invention, and which includes a table-like base 2 preferably of rectangular shape and having a plate-like upper surface 3 for supporting work pieces, such as tile, in position to be acted upon by a cutting and breaking mechanism. The table 2 includes relatively short legs 4 at the corners thereof which are preferably formed as extensions of depending flanges 5. Mounted at one side of the table in a corner 6 thereof is a standard-like bracket 7 cooperating with a similar bracket 8 located on a lateral extension 9 at the adjacent corner 10 to support a guide 11. The brackets 7 and 8 include base plates 12 that are secured to the table top by fastening devices 13. Extending upwardly from the plates are standards 14 having vertically slotted heads 15 arranged transversely of the guide. The outer faces 16 of the brackets are formed on vertical planes to provide vertical ways 17 to adjustably mount guide heads 18. The guide heads 18 include plate portions 19 conforming in shape to the ways and have bosses 20 and 21 at the ends which are provided with horizontally arranged bores 22 and 23 to receive the ends of guide rods 24 and 25.

Figure 2:
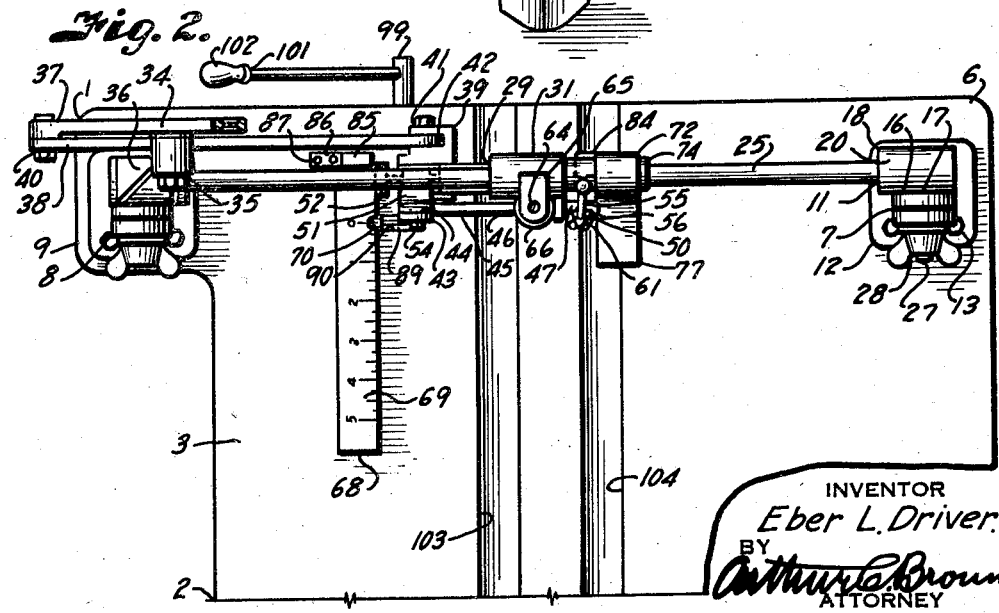
Fig. 2 is a fragmentary plan view of the apparatus.

The plate portions 19 have central bosses 26 carrying threaded studs 27 projecting through the slotted heads 15 whereby the heads are clamped against the standards upon tightening of wing-nuts 28 carried on the threaded ends of the studs, as clearly shown in Figs. 1 and 2. It is obvious that by loosening the wing-nuts 28 the guide rods may be adjusted relatively to the table 2 and retained in adjusted position upon retightening of the nuts so as to position the cutter and upper breaker in accordance with the thickness of the work piece as later described.

Slidably mounted on the rods 24 and 25 is a carriage 29 including a substantially A-shaped frame 30 provided with a sleeve 31 at the apex having a bore of sufficient diameter to slidably engage the rod 25. The lower terminals of the frame carry similar sleeves 32 and 33 having similar bores to slidably engage the lower rod 24, whereby the frame is freely slidable on the guide rods responsive to actuation of a lever 34. The lever 34 is pivoted, as at 35, to an arm-like extension 36 of the bracket 8 and has a depending end 37 connected by a link 38 with a lug 39 extending laterally from the carriage frame, the link 38 being connected with the end 37 of the lever by a pivot connection 40 and with the lug 39 by a pivot connection 41. The lug 39 is preferably slotted, as at 42, to accommodate the end of the link as best shown in Fig. 2.

Projecting from the inner side of the frame, adjacent the sleeve 32, is a lug 43 having an upwardly opening slot 44 to accommodate a bell-crank lever 45 therein. The bell-crank includes a horizontally extending arm 46 having a free end 47 guidingly retained in a slot 48 projecting in a laterally extending wing 49 adjacent the sleeve 33, and carries a cutter supporting seat 50. The other arm 51 of the bell-crank extends upwardly and laterally toward the frame to carry an adjusting screw 52 in aligning registry with a stop boss 53 on the frame of the carriage. The bell-crank just described is pivotally mounted within the slot of the lug 43 on a pivot screw 54.

The cutter 55 is a conventional glass cutter, having a flat head 56 engaging in the seat 50 and carrying a cutting wheel 57. The cutter is retained in position in the seat by studs 58 and 59 extending laterally from the face of the seat and engaging in the notches 60 of the cutter head. One of the studs, for example the stud 59, is threaded to mount a wing-nut 61 whereby the cutter head is clamped in the seat of the bell-crank. In order to exert a yielding pressure on the cutter whereby the cutter wheel may travel over irregular surfaces of the tile, the arm 46 is pivotally connected, as at 62, with a yoke 63 carried on the end of a stem 64. The stem 64 has its upper end slidably mounted in a guide lug 65 projecting laterally from the sleeve 31. The lower portion of the stem is preferably threaded to accommodate an adjusting nut 66. Sleeved over the stem and having one end engaging the nut 66 and the other the lug 65 is a compression spring 67. It is thus obvious that while a yielding pressure is exerted on the cutter, the extent of movement of the bell-crank in a downward direction responsive to movement of the spring is regulated by manipulation of the adjusting nut 52.

Fixed on the table and extending at right angles relatively to the guide rods is a stop or abutment rail 68, having a scale 69 thereon whereby the size of the tile to be cut is measured. The zero end of the scale aligns with the cutting wheel 57 and has a notch 70 therein to receive the cutter when the cutter passes off the edge of the tile, as later described.

Also mounted on the guide rods 24 and 25 is an upper breaker member 71, including a vertically arranged leg 72 carrying sleeves 73 and 74 having bores 75 and 76 of suitable size to slidably mount the breaker member on the guide rods in abutting relation with the sleeves 31 and 33 previously described, the abutting ends being of sufficient length to space the leg of the breaker member a desired distance from the carriage to provide freedom of movement for the cutter.

Formed on the lower end of the leg is a foot 77, having an arch-shaped lower face 78 with the apex 79 thereof located in registry with the cutting wheel 57. From the apex 79 the sides diverge downwardly and outwardly as indicated at 80 and 81, Fig. 6, to terminate in tile pressing portions 82 and 83 which also extend parallel with the line of cut. Extending laterally from the foot of the breaker member, preferably in the plane of the face portion 80, is a lug 84 having interlocking engagement with a lug 85 carried on an angle-shaped bracket 86, the bracket 86 being secured to the table by fastening devices 87 adjacent the end of the abutment rail 68 so that after the carriage has reached the end of its movement upon effecting cut of a tile, the lug 85 cooperates with the rods 24 and 25 to prevent upward movement of the breaker member when pressure is applied thereagainst by a lower breaker member 88.

The lower breaker member 88 includes a tongue 89 movable through an opening 90 provided in the table top in registry with the travel of the cutter wheel. The tongue 89 is carried on a plate 91 movable between angle-shaped brackets 92 and 93 depending from the under side of the frame and guidably supported on guides 94 and 95. The guides 94 and 95 comprise cap-screws having their shanks passing through openings 96 in the plate and threaded into the table top. Mounted on the shanks of the screws and having one end bearing against the plate and the other end against the table top are coil springs 97 and 98 to return the breaker tongue to retracted position. Rotatably mounted in the brackets 92 and 93 is a rock-shaft 99 carrying a cam 100 adapted to engage the under side of the plate and to effect raising of the tongue into contact with the under surface of the tile upon rocking of the shaft. The shaft 99 is actuated by a lever arm 101 having a handle 102 at the outer end thereof.

In order to accommodate tile having molding-like projections at the upper edge, the surface of the table is provided with grooves or recesses 103 and 104. When cutting this form of tile, the tile is turned face up, so that the nose thereof enters one or the other of the grooves depending upon the size of the tile and the cut is made across the face thereof.

As it is impossible to break the corners of tiles, the table is provided with a clamping device, including a clamping bar 105 attached to one side of the table, preferably the side adjacent the bracket 7 and cooperating therewith is a movable clamping bar 106 having its ends guidingly supported for movement to and from the bar 105 on studs 107 and 108. The studs carry coil springs 109 and 110 having their lower ends bearing against the table and their upper ends against the bar 106 to normally retain the bar in retracted position. The bar 106 is moved in clamping relation with the tile supported on the bar 105 by wing-nuts 111 and 112 located on the projecting ends of the studs.

In using an apparatus constructed and assembled as described, a tile, indicated by the dotted lines designated $a$, is applied on the table with the end thereof abutting against the rail 68. The tile is then shifted laterally therealong so that the line of the cut registers with the zero point of the scale. When the tile is applied to the table, the carriage is, of course, in retracted position. The heads carrying the guide rods are then adjusted vertically so that the cutter moves over the upper surface of the tile with a slight space between the tile and the portions 82 and 83 of the foot of the breaker member. After adjustment, the wing-nuts are tightened to retain the guides in adjusted position. The adjusting screw 52 is then manipulated to provide proper tension on the cutter. The lever 34 is then manipulated to effect movement of the carriage across the tile so that the cutter wheel forms a cut in the surface thereof along the line that the tile is to be broken. The handle is moved to the point where the cutter wheel travels off the edge of the tile engaging the abutment rail. In this position, the lug 84 has engaged under the lug 85 and the cutter 57 is positioned within or over the notch 70. The tile is then ready for breaking. In this position of the carriage, the upper breaker member is in position directly over the lower breaker member. The lever 101 is then actuated to rock the shaft 99 and cause the cam 100 thereon to project the lug against the under surface of the tile and raise the tile against the arch-shaped foot as shown in Fig. 5. Since the portions 82 and 83 of the foot first contact the tile, the pressure applied to the tile through the tongue at the point of cut effects breaking of the tile into separate parts as shown at $b$ and $c$, Fig. 5. It is thus obvious that the tile is readily broken in the position at which the cut is formed so that the break occurs directly on the line of cut, thereby resulting in a straighter face on the broken side of the tile pieces. After breaking, the carriage is shifted to retracted position by reversing movement of the lever 34, after which the tile pieces are moved from the table preparatory to similar operations on succeeding tiles.

If a corner is to be removed from a tile, a cut is made thereacross by holding the tile in the line of movement of the cutter. The corner is then applied between the bars 105 and 106 and the wing-nuts tightened, after which pressure applied on the projecting portion of the tile will effect breaking thereof along the line of the cut.

From the foregoing it is obvious that I have provided a cutting and breaking apparatus which is particularly adapted for breaking work pieces of brittle character in a more facile and accurate manner with a minimum danger of flying particles incidental to breaking the tile on the line of cut. It is also obvious that since the breaking is made in the same position as the cut, the break is accurately produced, resulting in tile pieces having sides substantially straight with the surfaces thereof.

What I claim and desire to secure by Letters Patent is:

1. The combination with a cutting mechanism including a work piece support, a cutter, and a support for the cutter movable relative to the work piece support to effect a cut across a work piece, of means for breaking the work piece on said cut including work piece pressing means carried by one of said supports and having work piece engaging portions on the respective sides of the cutter, work pressing means carried by the other support and having a work engaging portion between said work engaging portions of the other pressing means, means on one of said supports for interlocking with the other when the cutter moves off the work piece being cut, and means for moving one of said pressing means toward the other to break the work piece along the cut.

2. In an apparatus of the character described, a support member having a work piece supporting surface, a work piece pressing means projectable over the supporting surface, a cutter, means supporting the cutter for movement over said pressing means, work piece pressing means carried by the cutter support and having work contacting portions offset with respect to the first named pressing means, means on the work supporting member for interlocking engagement with the cutter supporting means when the cutter has moved across the work piece, and means for projecting the first named pressing means toward the pressing means carried by the cutter support to effect breaking of the work piece carried on the work support.

3. An apparatus of the character described, including a table, brackets carried at opposite sides of the table, guides supported by the brackets, a work piece stop on the table, a carriage on said guides and movable in the direction of said stop, a bell-crank lever pivoted on the carriage, a cutter carried by one arm of the bell-crank lever, a spring on the carriage engaging the arm to press the cutter into contact with a work piece supported on the table and engaging said stop, a work piece engaging member fixed to said carriage and having a foot registering with the cutter, a work piece pressing member movably supported by the table for contacting the work piece on the side opposite the cutter, and means carried by the table for moving said pressing member into contact with the work piece to press the work piece against said foot to break the work piece along the cut effected by said cutter.

4. An apparatus of the character described, including a table for supporting a work piece, a work piece stop on the table, a carriage, means supporting the carriage for movement over the work piece, a cutter on the carriage, a work piece engaging member fixed to said carriage and having a foot portion adapted to engage the work piece on opposite sides of a cut in said work piece, a work piece pressing member movably supported by the table for contacting the work piece on the side opposite said foot portion, a lug on the carriage, a bracket on the table having a portion engageable with the lug of the carriage when the carriage is moved across the work piece, and means carried by the table for moving said pressing member into contact with the work piece to press the work piece against said foot to break the work piece along said cut.

5. An apparatus of the character described, including a table, a work piece stop on the table, a carriage movable across the table in the direction of said stop, a bell-crank lever pivoted on the carriage, a cutter carried by one arm of the bell-crank lever, a spring on the carriage engageing the arm to press the cutter into contact with a work piece supported on the table in engagement with said stop, a work piece engaging member fixed to said carriage and having a foot portion on the side of the cutter opposite said stop, a work piece pressing member movably supported by the table for engaging under the work piece, and means carried by the table for moving said pressing member into contact with the work piece to press the work piece against said foot to break the work piece along the cut effected by said cutter.

EBER L. DRIVER.